UNITED STATES PATENT OFFICE.

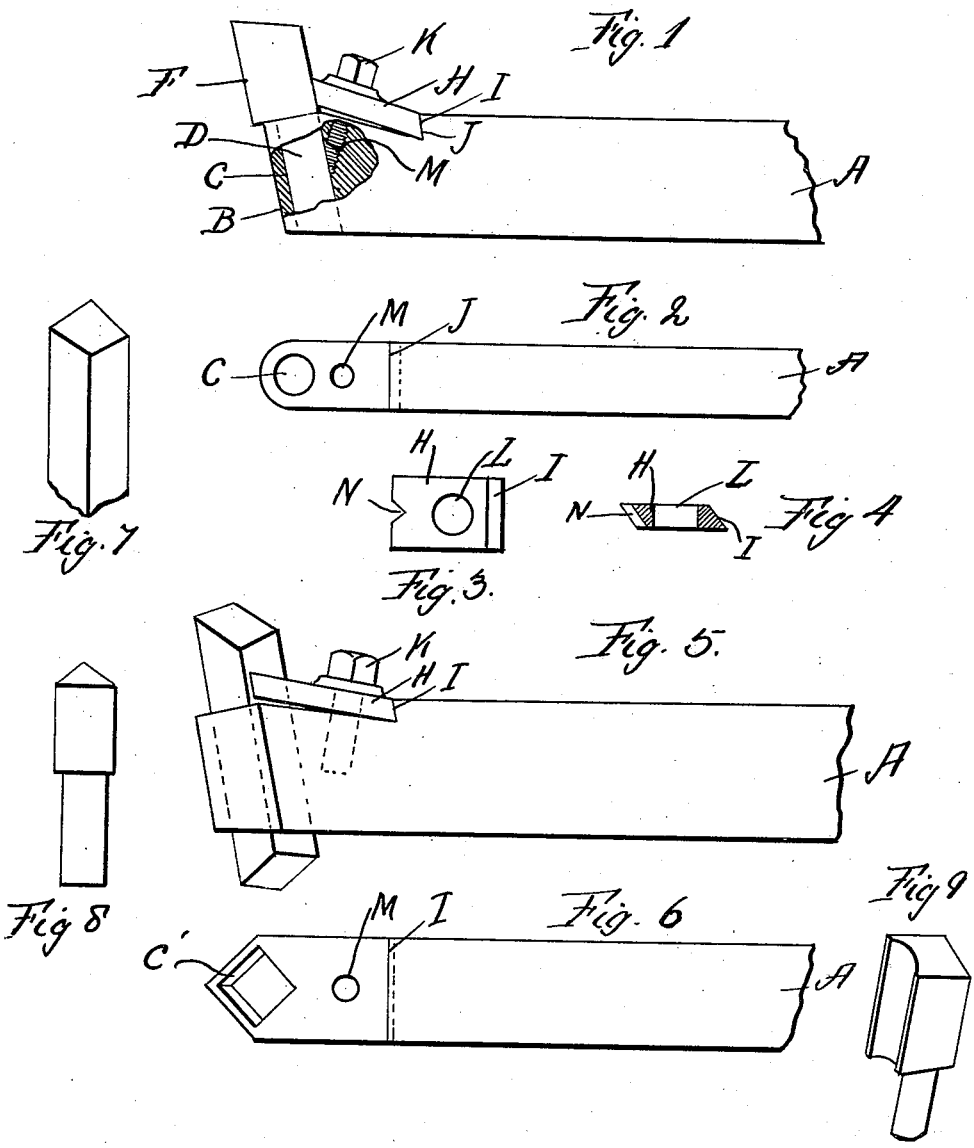

JOSEPH G. BAKER, OF VINELAND, NEW JERSEY.

TOOL-HOLDER.

1,011,714.  Specification of Letters Patent.  Patented Dec. 12, 1911.

Application filed March 6, 1911. Serial No. 612,457.

*To all whom it may concern:*

Be it known that I, JOSEPH G. BAKER, a citizen of the United States, residing at Vineland, in the county of Cumberland and State of New Jersey, have invented a certain new and useful Improvement in Tool-Holders, of which the following is a specification.

My invention relates to new and useful improvements in tool holders, and has for its object to construct a device of this character to be used principally upon lathes, planers and shapers and to provide a holder which will permit of the rapid interchange of tools.

A further object of the invention is to form the tool holder of peculiar construction so as to give a clearance between the holder and the work.

A still further object of my invention is to provide a clamp for tool holders which will be very simple, relatively small, inexpensive in the cost of manufacture, but very strong and durable and one which will fasten the tool in place very quickly and without a great pressure exerted on the screw as it wedges between the tool and holder.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1, is a side elevation of my improved tool holder a portion thereof being broken away to more plainly show the construction, and also showing one form of tool in the holder. Fig. 2, a plan view of the holder, the tool and clamp being removed. Fig. 3, a plan view of the clamp. Fig. 4, a longitudinal sectional view thereof. Fig. 5, a side elevation of a slightly modified form of tool holder, showing a tool in place. Fig. 6, a plan view thereof, the tool and clamp being removed, and Figs. 7, 8 and 9 are some of the different forms of tools that can be used with this holder.

In carrying out my invention as here embodied, A represents the tool support or shank, the forward end of which is beveled rearwardly from its upper surface toward its lower surface as at B and in the forward end is formed a round aperture C which is formed in an angle to the upper face of the tool support, so that it runs approximately parallel with the beveled end B. In this aperture is placed the shank D of the tool F. The tool here shown being a female tool, but it is to be understood that any style or shape of tool may be used therein, provided the shank is round, and where the head of the tool is round it is necessary to square a portion thereof for the abutment of the clamp H. Said clamp having approximately parallel beveled ends I, one beveled end fitting in the under-cut notch J in the upper surface of the tool support. This clamp is slightly longer than the shortest distance between the under-cut notch J and the head of the tool, so that when said clamp is placed in position it will rest at an angle to the upper face of the tool support, and when forced down by the clamp screw K which passes through the hole L in the clamp and is threaded in the screw receiving hole M in the tool support, it will wedge itself against the tool and the under-cut notch J, securely holding the tool in place. If found desirable the clamp may be provided with a notch N in that end which engages the tool, so that in a square headed tool, one corner of said tool will register with said notch N.

From this description it will be seen that a very slight pressure of the clamp screw K upon the clamp H will wedge it between the under-cut notch J and the tool, thereby forcing the shank of the tool against the side walls of the aperture C and firmly holding the tool in the holder. By beveling the forward end of the tool support inward toward its lower face, a clearance for the work is provided.

In Figs. 5 and 6 I have shown a slightly modified form of my invention in which I employ a squared aperture C' in the forward end of the tool support, said aperture taking the same position as the one in the first described form.

Of course I do not wish to be limited to the exact details of construction as here shown, as these may be varied within the limits of the appended claim without departing from the spirit of my invention.

Having thus fully described my invention, what I claim as new and useful, is—

A tool holder comprising a tool support having its forward end beveled inward toward its lower face, the upper face of said support having a relatively short under cut notch formed therein adjacent its forward end, said forward end having an aperture therein for the reception of a tool shank, a clamp, the length thereof being greater than the shortest distance between the under cut notch and the head of the tool carried in the holder, the ends of which are beveled parallel with each other, said clamp resting in the under cut notch and engaging with a tool carried in the holder, and means for drawing said clamp downward to force the tool against the walls of the aperture as shown and described.

In testimony whereof, I have hereunto affixed my signature in the presence of two subscribing witnesses.

JOSEPH G. BAKER.

Witnesses:
EDW. W. AUSTIN,
W. E. YOST.

Copies of this patent may be obtained for five cents each, by addressing the "Commissioner of Patents, Washington, D. C."